United States Patent Office 2,884,383
Patented Apr. 28, 1959

2,884,383

POLYMERS OF 4,6-BIS-TRICHLOROMETHYL 1,3,5-TRIAZINE

Christoph J. Grundmann and Alfred Kreutzberger, Columbus, Ohio, assignors to Olin Mathieson Chemical Corporation, a corporation of Virginia No Drawing. Application May 26, 1954
Serial No. 432,607

7 Claims. (260—2)

Our invention relates to the preparation of linear polymers by the condensation of bis-trichloromethyltriazines with monomeric polyamines. More particularly, it relates to linear polymers formed by the condensation at elevated temperatures of approximately equal molar amounts of 4,6-bis-trichloromethyl-1,3,5-triazines with alkylene diamines or other lower alkylene polyamines. Although the structural formula has not been definitely established the linear polymers of our invention are formed by a condensation reaction which may possibly be represented by the following equation. A diamine is shown by way of illustration.

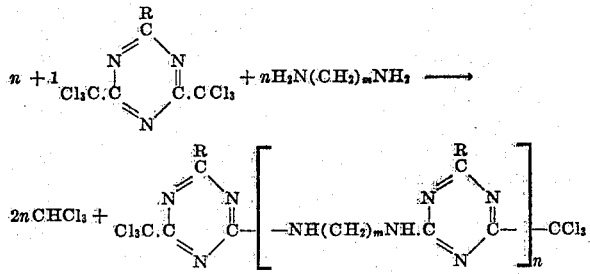

In the above equation $n$ is about 5 to 50 or more and $m$ is 2 to 10 or more. In the above formulae, R represents hydrogen or a hydrocarbon radical, for instance, a simple alkyl radical such as methyl, ethyl, propyl, butyl and the like, or it may be an aromatic radical such as phenyl, chlorophenyl, tolyl, cyclohexyl or the like.

The novel polymers of our invention can be prepared by the condensation of bis-trichloromethyltriazines with alkylene diamines or other polyamines in approximately equal molar proportions with or without a solvent at temperatures ranging from about 80 to 220° C. An excess of as much as 50 percent or more polyamine may be employed, however. Reaction times commonly range from 1 to 5 hours but may run to 12 hours or more. The solvent, if any, may be removed by vacuum distillation or, alternatively, the solid polymer may be precipitated from the solvent by the addition of a different solvent in which the polymer is insoluble. Solvents suitable for use in the preparation of our novel polymers are m-cresol, dimethylformamide, acetonitrile, or other inert solvents commonly used in reactions of this type. The proportion of solvent employed is not critical and may range from 1 to 10 parts by weight per part of the reactants used. We have found that acetonitrile is a particularly useful solvent for this reaction in that it yields products of exceptionally light color. The polymers of our invention are insoluble in most common organic solvents such as acetone or ligroin; therefore, such solvents may be used to precipitate the polymer from the reaction medium.

The polyamines useful in our invention in general are those which have from 2 to 10 or more carbon atoms. These include alkylene diamines such as ethylene diamine, butylene diamine, hexamethylenediamine and similar lower alkylene diamines as well as monomeric alkylene polyamines such as diethylenetriamine, triethylenetetramine and homologs of these compounds.

Many of the linear polymers of our invention are useful in the production of fibres. In general, the value of $n$ in the equation above should be from 5 to 10 and $m$ should preferably be greater than 2 if the polymer is to be easily converted to fibres by melt spinning. Products of this description have a molecular weight of about 1500 to about 2500.

In the preparation of the novel linear polymers of our invention chloroform is formed as a by-product, apparently through combination of hydrogen from the amino group of the diamine and the CCl$_3$ group of the trichloromethyltriazine. The bis-trichloromethyl triazines used as starting materials for the polymers of our invention are readily prepared by methods well known in the art, i.e., by the condensation of mixtures of two moles of trichloroacetonitrile with one mole of acetonitrile, benzonitrile or other suitable nitrile in the presence of hydrogen chloride.

Our invention will be further illustrated by the following specific examples:

Example I

Ten parts by weight (0.029 mole) of 2-methyl-4,6-bis-trichloromethyl-1,3,5-triazine and 2.5 parts by weight (0.042 mole) of ethylene diamine were dissolved into 25 parts by weight of m-cresol and heated for 4 hours at 205 to 210° C. Chloroform was evolved. The m-cresol was removed under vacuum, leaving a crude reddish-brown reaction product which melted at 85 to 95° C. The crude product was purified by successive extractions with boiling alcohol and acetone. The purified condensation product was a powder, faintly yellow in color, which decomposed without melting at about 350° C. The product was insoluble in all of the usual organic solvents. The chlorine content of the product indicated that the polymer corresponded to the following formula:

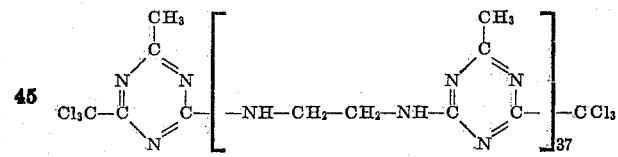

The procedure of this example is also used to condense 4,6-bis-trichloromethyl-1,3,5-triazine and 2-ethyl, 2-propyl, 2-butyl, etc. substituted 4,6-bis-trichloromethyl-1,3,5-triazines with various other alkylene diamines or polyamines having up to 10 or more carbon atoms.

Example II

The condensation of Example I was repeated using dimethylformamide instead of m-cresol as the solvent. The reaction mixture was heated for 3 hours at 170 to 180° C. The mixture was cooled and 5 volumes of acetone were added for each volume of dimethylformamide solvent used. The precipitated polymer was similar to that obtained in Example I but was of lower molecular weight. The chlorine content of the product indicated that $n$ in the formula shown in Example I had a value of about 21. The crude product softened at 165° C. The polymer was further purified by successive extractions with boiling acetone and alcohol to give a purified product which melted at 240° C. Ligroin can be substituted as a precipitating agent for the acetone used in this example.

Example III

Ten parts by weight (0.029 mole) of 2-methyl-4,6-bistrichloromethyl-1,3,5-triazine and 3.5 parts by weight (0.03 mole) of hexamethylene diamine were heated in 25 parts by weight of dimethylformamide for 3 hours at 160 to 170° C. Chloroform was evolved. The polymeric condensation product precipitated during the reaction. The reaction mixture was cooled and diluted with 50 parts by weight of acetone, boiled for a short time and filtered. The solid was purified by successive extractions with boiling acetone, alcohol, and carbon tetrachloride. A yellow powder was obtained which melted at 194 to 195° C. Elastic fibers were drawn from a melt of the product. The product was soluble in nitrobenzene and dilute mineral acids. The polymer may be precipitated from mineral acid solutions by neutralization with dilute alkali. The chlorine content of the polymer was 10.42% which indicated that its formula was:

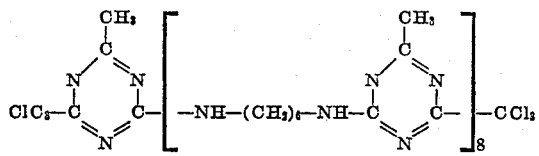

*Example IV*

Ten parts by weight (0.029 mole) of 2-methyl-4,6-bis-trichloromethyl-1,3,5-triazine and 5 parts by weight (0.043 mole) of hexamethylene-diamine were heated together for 2 hours at 160–170° C. The reaction mixture slowly became viscous and cooled to a solid. Extracted successively with boiling acetone and alcohol, a polycondensation product very similar in its properties to that described in Example III was obtained. The polymer had a melting point of 175 to 180° C.

*Example V*

The polycondensation was carried out using 1000 parts by weight of 2-methyl-4,6-bis-trichloromethyl-1,3,5-triazine and 350 parts by weight of hexamethylene diamine in 1500 parts by weight of acetonitrile. The mixture was refluxed at about 80° C. for 12 hours, precipitated, filtered and extracted with acetone. The product was a very light colored polymer which softened at about 172° C. and melted at 185 to 200° C. with some darkening.

The examples above are illustrative only and are not to be construed as limiting the scope of our invention.

We claim:

1. The linear polymeric condensation products of the condensation at a temperature of about 80 to 220° C. of substantially equimolar proportions of an alkylene polyamine containing 2 to 10 carbon atoms and from 2 to 4 amino groups, having at least 2 carbon atoms in each alkylene group, with a 4,6-bis-trichloromethyl-1,3,5-triazine of the formula

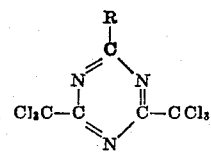

wherein R is selected from the group consisting of hydrogen and the radicals alkyl of 1 to 4 carbon atoms, cyclohexyl, phenyl, tolyl and chlorophenyl.

2. The products of claim 1 in which the alkylene polyamine is ethylene diamine and the triazine is 2-methyl-4,6-bis-trichloromethyl-1,3,5-triazine.

3. The products of claim 1 in which the alkylene polyamine is hexamethylene diamine and the triazine is 2-methyl-4,6-bis-trichloromethyl-1,3,5-triazine.

4. The process for the production of linear polymeric products which comprises reacting a 4,6-bis-trichloromethyl-1,3,5-triazine of the formula

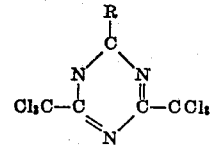

wherein R is selected from the group consisting of hydrogen and the radicals alkyl of 1 to 4 carbon atoms, cyclohexyl, phenyl, tolyl and chlorophenyl, with an approximately equal molar amount of an alkylene polyamine containing from 2 to 10 carbon atoms and from 2 to 4 amino groups, having at least 2 carbon atoms in each alkylene group, at a temperature of about 80 to about 220° C.

5. The process of claim 4 in which the reaction is conducted in the presence of an inert solvent.

6. The process of claim 4 in which the alkylene polyamine is ethylene diamine and the triazine is 2-methyl-4,6-bis-trichloromethyl-1,3,5-triazine.

7. The process of claim 4 in which the alkylene polyamine is hexamethylene diamine and the triazine is 2-methyl-4,6-bis-trichloromethyl-1,3,5-triazine.

References Cited in the file of this patent

UNITED STATES PATENTS 2,723,244    Joyce et al. _____ Nov. 8, 1955

FOREIGN PATENTS 682,391    Germany _____ Oct. 13, 1939

OTHER REFERENCES

Chem. Abs., p. 5806(d), 1950.